July 7, 1942. W. L. KAUFFMAN, 2D 2,289,288
REVERSING GEAR MECHANISM
Filed Oct. 5, 1939
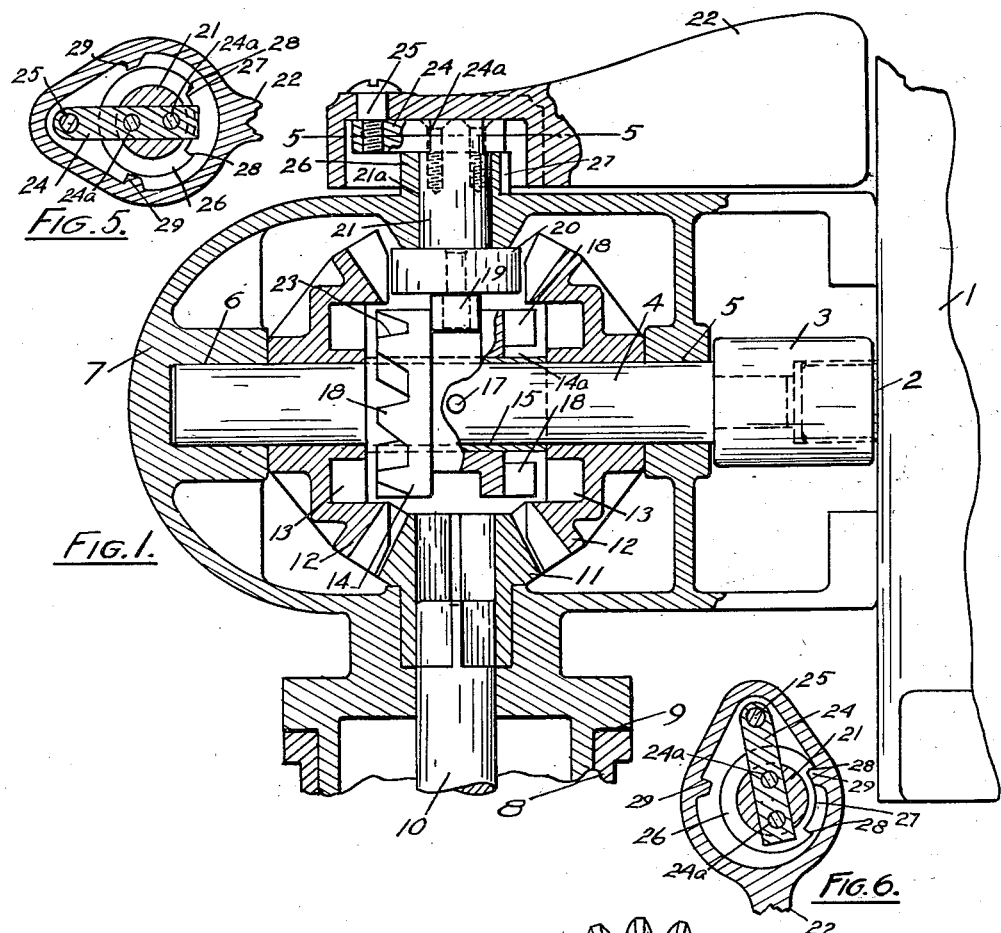
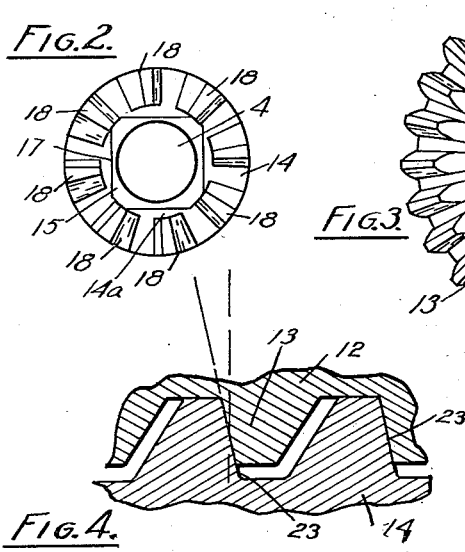
Walter L. Kauffman II
INVENTOR.
BY
ATTORNEYS.

Patented July 7, 1942

2,289,288

UNITED STATES PATENT OFFICE 2,289,288

REVERSING GEAR MECHANISM

Walter L. Kauffman, II, Erie, Pa., assignor to Lovell Manufacturing Company, Erie, Pa., a corporation of Pennsylvania Application October 5, 1939, Serial No. 298,103

2 Claims. (Cl. 74—378)

In many environments reversing gear mechanisms are actuated under conditions making it desirable to make the disengagement of the gears possible with a minimum of effort. Such a condition is encountered in relation to wringers, in the operation of which the operator is sometimes caught in the rolls.

One type of safety device for preventing very serious injury is to stop the driving connection to the rolls. The accident itself places a heavy load on the driving connection, and where the ordinary clutch is used, the releasing effort is quite large and may not be accomplished by the operator under panic conditions. The present invention is designed to make this release, regardless of the load, sensitive. Features and details of the invention will appear from the specification and claims.

A preferred embodiment of the invention is illustrated in the accompanying drawing as follows:

Fig. 1 shows a central section of a reversing gear mechanism as attached to a wringer.

Fig. 2 an end view of a sliding clutch member.

Fig. 3 an end view of one of the reversing gears carrying a part of the clutch.

Fig. 4 an enlarged circumferential section of a portion of the clutch jaws.

Fig. 5 a section on the line 5—5 in Fig. 1, with the parts in neutral.

Fig. 6 a similar section with the parts in set and locked position.

1 marks a wringer frame; 2 a drive shaft leading to the wringer; 3 a coupling engaging a driven shaft 4 of the gear mechanism. The shaft 4 is journaled in bearings 5 and 6 in a gear head 7. The gear head is mounted on a post 8 through a swivel connection 9 as is the common practice in a reversing gear for a wringer. A driving shaft extends upwardly through the post 8 from some source of power, not shown.

A bevel gear 11 is fixed on the upper end of a shaft 10, and reversing gears 12 are placed at opposite sides of the bevel gear 11 and mesh with that gear. The gears 12 have clutch jaws 13 arranged around their opposing faces.

The shaft 4 extends through a sleeve 15, which is squared on its outer surface. The sleeve 15 is locked with the shaft 4 by a pin 17. A sliding clutch member 14 has a squared opening which is slidingly mounted on the outer squared surface of the sleeve 15. The clutch member has jaws 18 which are adapted to lock the clutch member with either of the reversing gears, and when in central position, is released from both gears. The clutch member has an annular groove 14a into which a crank 19 extends. The crank 19 is carried by a disc 20, and a shaft 21 extends from the disc through a bearing 21a in the gear head. The shaft is operated by a handle 22 so as to throw the clutch member into or out of engagement with the reversing gears to accomplish the reversal.

Engaging surfaces 23 of the clutch jaws are inclined, as clearly shown in Fig. 4. This inclination approximates the critical angle of friction, that is to say, where the friction resistance to disengagement approximates the camming action of the inclined surfaces.

Under certain conditions, this inclination may be such as to make the camming action slightly preponderant so that when the locked position of the gears is released, the thrust itself will accomplish the release of the clutch. On the other hand, under certain conditions it may be desirable to make the friction slightly preponderant, making the engaging surfaces more nearly axial. In any event, the release may be made definitely sensitive in relation to the environment or condition in which it is used.

Where the inclination is at neutral or where the camming action preponderates, it is desirable not only to operate the clutch, but to lock it in adjustment so that it will not accidentally release itself. This is accomplished in the present invention as follows:

An arm 24 is secured on the shaft 21 by pins 24a which lock the arm 24 with the shaft. The handle is pivotally mounted on the arm by a pin or screw 25, thus the pivot for the handle is opposite or eccentric to the center of the shaft. The under side of the handle is provided with a cavity which receives the arm 24 and also a boss 26 extending upwardly from the gear head. This boss is notched at 27 forming opposing abutments 28 at the end of the notch. Abutments 29 are arranged on the inside of the handle in position to enter, when the handle is turned, the notch 27 and to engage the abutments 28.

With the handle in neutral as shown in Fig. 5, the initial pressure on the handle moves the handle around the center of the shaft, the abutments 29 operating on the boss maintain the arm 24 in alignment with the handle centering the handle and in effect locking the handle with the shaft in connection with the arm 24 until the abutment moving toward the notch 27 reaches that notch and passes into it.

When the shaft has been turned a sufficient distance to set the clutch, the abutment opposite the side toward which the handle is moved reaches the notch 27 and passes into the notch. The handle is left in this position and locks the clutch against disengagement whether the friction and inclination are exactly neutralized or whether one or the other is preponderant.

When it is desired to release the clutch member, a movement of the handle results in swinging the abutment 29 out of engagement with the abutment 28 and the abutment 29 into engagement with the boss 26. When the handle reaches this position, a further movement of the handle moves the shaft with the handle until the parts are brought to neutral or, if the movement of the handle is continued, until the reverse position is reached and the clutch locked in the reverse position.

What I claim as new is:

1. In a reversing gear mechanism having reversing gears and controlling means shifting the gear mechanism comprising an oscillating shaft oscillatably mounted and settable for reverse driving or neutral; the combination with said gear mechanism and said shaft of a fulcrum wall at the sides of the shaft having curved surfaces, a handle pivotally mounted on the shaft offset from the shaft center and engaging the fulcrum surface offset from the pivotal connection with the shaft, said wall and handle having interlocking shoulders brought into engagement with an oscillating setting movement of the handle by a pivotal movement of the handle relatively to the shaft and released with initial return movement of the handle for releasing the interlocking shoulders.

2. In a reversing gear mechanism having reversing gears and controlling means shifting the gear mechanism comprising an oscillating shaft oscillatably mounted and settable for reverse driving or neutral; the combination with said gear mechanism and said shaft of a fulcrum wall at the sides of the shaft having curved surfaces, a handle pivotally mounted on the shaft offset from the shaft center, said handle having a pocket into which the shaft and fulcrum walls extend, said fulcrum walls and the interior walls of the pocket having interlocking shoulders brought into engagement with an oscillating setting movement of the handle by a pivotal movement of the handle relatively to the shaft and released with initial return movement of the handle for release.

WALTER L. KAUFFMAN, II.